(12) United States Patent
Hughes et al.

(10) Patent No.: US 7,620,503 B2
(45) Date of Patent: Nov. 17, 2009

(54) SIGNAL PROCESSING FAULT DETECTION SYSTEM

(75) Inventors: Derke R. Hughes, Warwick, RI (US); Richard A. Katz, East Lyme, CT (US); Albert H. Nuttall, Old Lyme, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 257 days.

(21) Appl. No.: 11/777,564

(22) Filed: Jul. 13, 2007

(65) Prior Publication Data

US 2009/0016597 A1    Jan. 15, 2009

(51) Int. Cl.
*G01B 3/52* (2006.01)
(52) U.S. Cl. .......................... 702/34; 702/56; 702/189; 714/25; 73/104; 73/799; 382/149; 382/325; 270/30.02
(58) Field of Classification Search ............. 702/34–35, 702/56, 81, 86, 189; 714/25; 73/104, 799; 382/149, 325; 270/30.02
See application file for complete search history.

(56) References Cited

U.S. PATENT DOCUMENTS

| 5,195,046 A | 3/1993 | Gerardi et al. |
| 5,258,923 A | 11/1993 | Imam et al. |
| 6,073,493 A | 6/2000 | Sakamoto et al. |
| 6,460,012 B1 | 10/2002 | Welch et al. |
| 6,498,992 B1 | 12/2002 | Toyota et al. |
| 6,567,752 B2 * | 5/2003 | Cusumano et al. ............ 702/34 |
| 6,799,126 B1 | 9/2004 | Ratcliffe et al. |
| 6,950,761 B2 | 9/2005 | Ramanujachar |
| 7,353,153 B2 * | 4/2008 | Ascenzi et al. ................ 703/11 |
| 7,505,852 B2 * | 3/2009 | Board .......................... 702/33 |
| 2005/0021256 A1 | 1/2005 | Wills et al. |
| 2005/0021257 A1 | 1/2005 | Wills et al. |

* cited by examiner

*Primary Examiner*—Edward Raymond
*Assistant Examiner*—Elias Desta
(74) *Attorney, Agent, or Firm*—James M. Kasischke; Jean-Paul A. Nasser; Michael P. Stanley

(57) ABSTRACT

A fault detection system designed to evaluate the structural integrity of a material employs an array of sensors disposed over the material being evaluated. The sensors detect vibrations in the material and the sensor signals are fed to a data processor. The processor employs a method to analyze the linear and nonlinear characteristics of the sensor signals and then determines whether to proceed with a linear signal processing analysis or a nonlinear signal processing analysis of the sensor signals. Once the analysis is completed, the results are compared to baseline results to determine what if any divergence exists between the results and the baseline results. A significant divergence indicates a potential material failure. The fault detection system will indicate such a potential failure through a visual alarm on a graphical user interface.

16 Claims, 8 Drawing Sheets

SIGNAL PROCESSING FAULT DETECTION SYSTEM

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention is directed to the detection and analysis of cracks, asymmetries, and imperfections within a material structure. In particular, the present invention is directed to a diagnostic tool that determines the linear and nonlinear characteristics of measured vibration signals in order to use the most appropriate signal processing technique for the identification of faults in structures and to determine quantitatively the predisposition of a structure to material failure.

(2) Description of the Prior Art

Dynamic loading, such as vibration, can be recorded by strain sensors. The strain sensor output signals in the form of time series data can be analyzed to determine the condition of a physical structure. Sensor signals from a "healthy" structure (i.e. a structure free of cracks, asymmetries and imperfections) are typically linear. The sensor signals from a structure with fatigue cracks and or other imperfections are typically nonlinear. The nonlinearity of time series data from sensors recording vibrations in structures with fatigue cracks can be classified as a discontinuity or as the simultaneous emission of several frequencies. With the advent of increased computational power in computers, there exists the computing capability to perform the calculations necessary to apply non-linear mathematical analysis techniques to time series data obtained from sensors, such as strain sensors.

There are several mathematical analysis techniques to determine the linear and/or nonlinear characteristics of strain sensor signals which represent the vibrations in a structure. One such technique is mutual information analysis. Mutual information analysis is a mathematical analysis technique derived from Information Theory. When dealing with random variables, a mutual information analysis will seek to determine the amount of information that one random variable contains about another random variable and vice versa. This sort of determination serves as a measure of dependence between the first and second random variables. Mutual information analysis can be used to test the dependencies between two sets of time series data, such as the data obtained from strain sensors.

Another mathematical analysis technique to determine the linear and nonlinear characteristics of strain sensor signals is wavelet analysis which is a linear mathematical analysis technique that can analyze discontinuities and edge effects. Wavelet analysis can define wavelets in either the real domain (referred to as real wavelets) or the complex domain (referred to as analytic wavelets). Real wavelets are suitable for identifying discontinuities and data compression. Analytic wavelets are suitable for capturing frequency content within a signal and therefore isolating simultaneous frequency emissions.

Other mathematical analysis techniques to determine the linear and nonlinear characteristics of strain sensor signals in the form of time series data are the surrogate data method, fast Fourier transforms and the phase space method. These methods are utilized (sometimes with other information or signal processing diagnostic techniques) to ascertain the linear or nonlinear characteristics of the measured data.

The above-described mathematical analysis techniques are capable of detecting the linear and/or nonlinear "behavior" of cracks, asymmetries, and imperfections within a material structure. In the past, methods for evaluating cracks and imperfections in material structures have relied primarily on linear mathematical analysis techniques as applied to time series data obtained from strain sensors (i.e. linear signal processing techniques), rather than non-linear mathematical analysis techniques (i.e., non-linear signal processing). Some linear signal processing techniques, however, fall short of identifying material failures or incongruities where such failures or incongruities are due to "nonlinearity" in the failure generating mechanism(s). In order to truly capture the range of potential material failures and discontinuities in a material structure, nonlinear signal processing techniques must also be considered to specifically determine any nonlinear behavior in the material structures. Determining the proper approach and combination of linear and nonlinear data signal processing techniques for evaluating structures in an efficient manner has become the challenge.

SUMMARY OF THE INVENTION

It is a general purpose and object of the present invention to efficiently obtain linear and nonlinear characteristics from time series data obtained from a sensor system in order to analyze the linear and nonlinear behavior of cracks, asymmetries, and imperfections within a material structure, and thereby detect such flaws in the structure.

It is a further object of the present invention to determine the proper approach and combination of linear and nonlinear signal processing techniques for efficiently evaluating time series data obtained from strain sensors attached to material structures.

The above objects are accomplished with the present invention by a system employing a series of strain sensors and a data processor that implements a method to preliminarily analyze the linear and nonlinear characteristics of the time series data generated by the strain sensors as they sense vibrations in the structure, and then determine whether further linear or nonlinear analysis on the time series data is warranted. After further analysis is performed on the time series data, the resulting values are compared to baseline values to determine if there are any significant imperfections in the material structure that would indicate a damaged structure. A graphical user interface joined to the data processor is used to alert a user of potential damage in the material structure.

BRIEF DESCRIPTION OF THE DRAWINGS

A more complete understanding of the invention and many of the attendant advantages thereto will be more readily appreciated by referring to the following detailed description when considered in conjunction with the accompanying drawings, wherein like reference numerals refer to like parts and wherein.

DETAILED DESCRIPTION OF THE INVENTION

Figure 1:
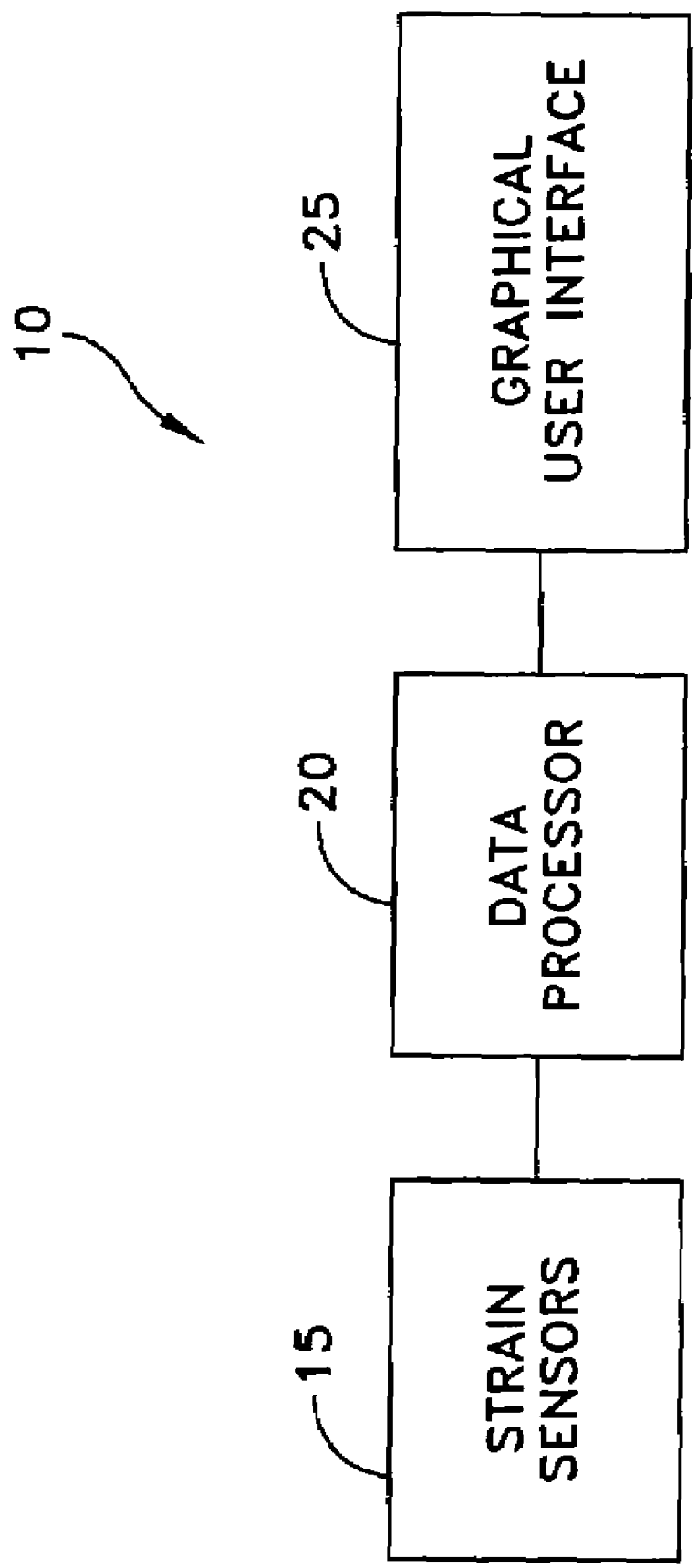
FIG. 1 is a block diagram of the system components including the sensors, the data processor, and the user interface.

Referring initially to FIG. 1, there is shown a block diagram of the signal processing fault detection system 10 of the present invention consisting of an array of sensors 15 capable of detecting vibrations in a structure, a data processor 20, and a graphical user interface 25. Sensors 15 such as piezoelectric strain sensors are deployed along a physical structure with the ultimate goal of assessing the condition of the structure. Other sensors that are capable of detecting vibrations could also be used. The sensors 15 are connected to the data processor 20, such as a computer system, that can receive sensor data and perform linear or nonlinear signal processing on the sensor signals.

Figure 2:
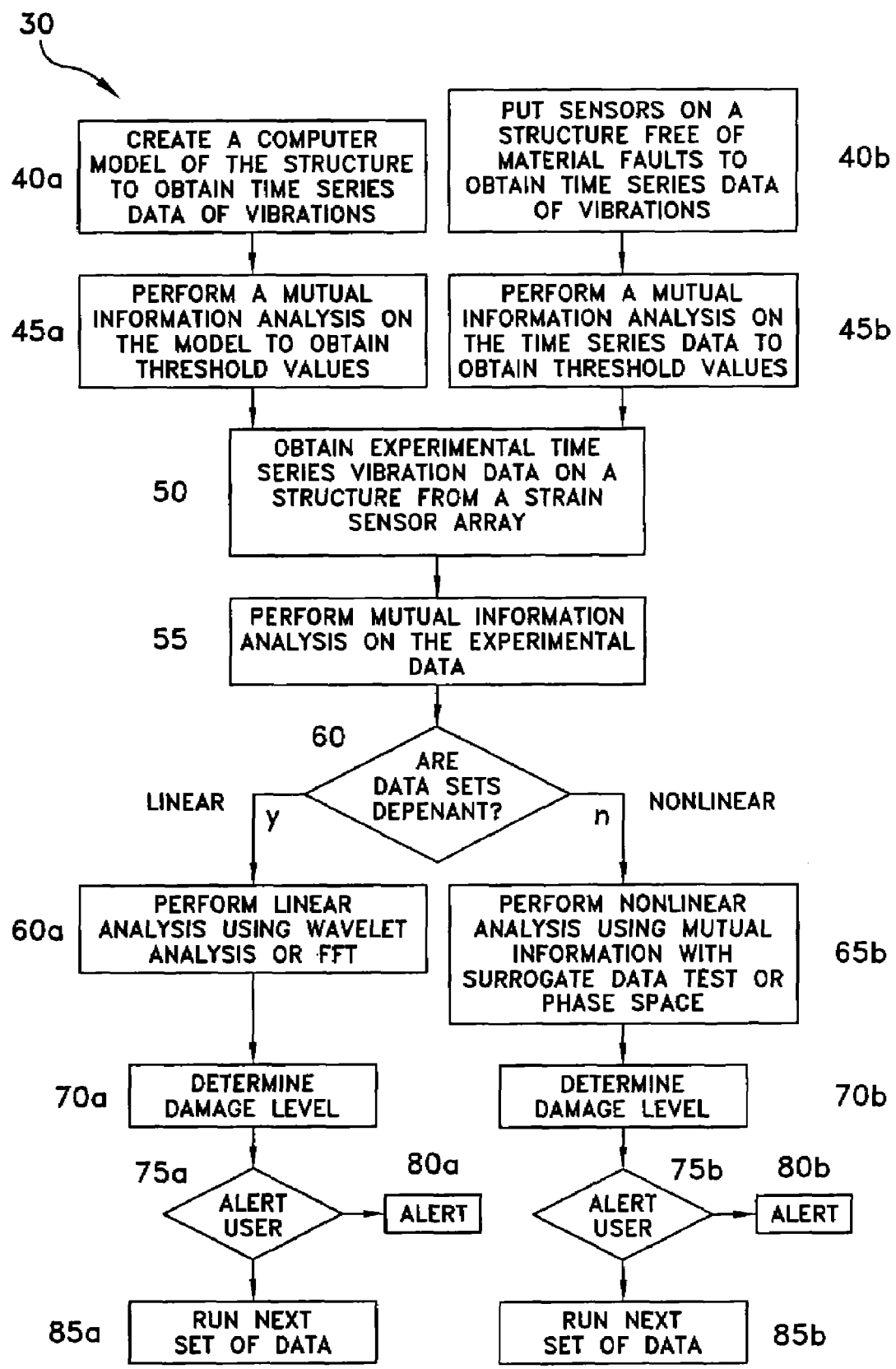
FIG. 2 is a flow chart of the method used in the fault detection system.

Referring to FIG. 2 there is shown a flow chart of the method to determine linear and nonlinear characteristics of time series data 30 obtained from the array of strain sensors 15 deployed on a physical structure to detect and record vibrations in the structure. The first step 40a in the flow chart is to create a computer model of the physical structure that is relatively free of structural faults. Such a model can be created using standard modeling software well known in the art. The computer model will provide time series data representing vibration signals that will serve as a baseline for the structure. Alternative, the first step 40b is to obtain a baseline of time series data from strain sensors 15 disposed about an actual physical structure that is relatively free of structural faults.

The second step in the flow chart 45a is to quantify the vibration signals obtained from the computer modeled structure and then perform a mutual information analysis on the signals to obtain a baseline of nonlinear values. Alternatively, the second step 45b is to quantify the actual historical data from the physical structure and then perform a mutual information analysis on the signals to obtain a baseline of nonlinear values. The baseline serves the purpose of establishing a threshold for comparison. For example, when measured quantified vibration signals are obtained from sensors disposed over similar structures or the same structure, and the quantified vibration signals are compared to and exceed the baseline, then it is an indication that there are faults in the similar structures or the same structure.

The third step in the flow chart 50 is to obtain experimental time series data of vibration signals from an array of strain sensors 15 deployed on a similar structure or the same structure for the purpose of detecting any material faults in the similar structure or the same structure.

The fourth step in the flow chart 55 requires a preliminary mutual information analysis be performed on the experimental time series data to determine whether the data has linear or nonlinear characteristics. The degree that data has linear or nonlinear characteristics requires a general and not specific determination because in theory each series of data can represent a unique physical situation. There can be a fault in a structure that exhibits nonlinear behavior but the degree of nonlinear behavior does not exclude the possibility of using a linear analysis technique to detect the fault.

Equation 1 is the general mutual information equation used in the fourth step 55 of the method illustrated in FIG. 2. The general mutual information equation is a probabilistic equation used here to assess the information between two random variables.

$$I_{A,B} = \sum_{a_i b_j} P_{AB}(a_i b_j) \log_2 \left[ \frac{P_{AB}(a_i b_j)}{P_A(a_i) P_B(b_j)} \right] \tag{1}$$

$P_{AB}(a_i b_j)$ is the joint probability of a set $A=\{a_i\}$ and a set $B=\{b_j\}$, while $P_A(a_i)$ and $P_B(b_j)$ are the marginal individual probabilities of each set of A and B. For example, set B can be a time-delayed version of set A.

The fifth step in the flow chart 60 is a decision step that requires a determination of whether the time series data has nonlinear characteristics based on the dependencies between the time series data sets A and B. If set A and set B have dependencies, then that is an indication that the time series data has linear characteristics because there is a correlation between the signals. If the time series data has linear characteristics, then a linear signal processing analysis will be performed. If the time series data does have nonlinear characteristics, then further nonlinear signal processing analysis will be performed.

According to the sixth step in flow chart 65a, when the data is determined to have linear characteristics as described above, a linear analysis such as wavelet transform analysis as expressed in Equation 2 or fast Fourier transform (FFT) analysis as expressed in Equation 3 is performed. The wavelet transformation equation is described according to:

$$\psi(a, u) = \int_{-\infty}^{\infty} f(t) \frac{1}{\sqrt{a}} \psi_{a,u}^* \left( \frac{t-u}{a} \right) dt \tag{2}$$

where $f(t)$ is the measured function (i.e. the time series data captured from the sensors) and $\psi^*_{a,u}$ is identified as the complex conjugate of the mother wavelet. The variable t represents time, a is defined as the scaling parameter, and u is termed the translation within the time domain.

The Discrete Fast Fourier Transform is written as $$X(\omega_k) = \sum_{n=0}^{N-1} x(t_n) e^{-j\omega_k t_n}, \tag{3}$$

$$k = 0, 1, 2, \ldots, N-1$$

where $x(t_n)$ is the input signal from the sensors at time $t_n$ usually in (sec), $t_n$ is the nth sampling instant in (sec). $X(\omega_k)$ is the spectrum of x at frequency $\omega_k$, $\omega_k$ is the kth frequency sample in (rad/sec), and N is the number of samples and number of frequency samples.

According to the seventh step of the flow chart 70a, the results of the linear analysis of the time series data are compared to the baseline values obtained in the second step 45a or 45b to approximate the damage level, if any, to the structure. The level of damage is an approximation based on the differences between the analyzed time series data and the baseline values. The magnitude of the difference is directly related to acceptable tolerances, which are based on the application of the structure itself. A static structure may allow for more of a difference between the analyzed data and baseline values than a dynamic structure.

According to the eighth step of the flow chart 75a a decision must be made as to whether to generate an alert because the structure is seriously damaged. If there is a serious level of damage as indicated by a large difference beyond the acceptable baselines, then the graphical user interface will create a visual alert 80a for a user. If there is not a serious level of damage, the next set of time series data of vibration signals is analyzed in the final step 85a.

Alternatively, at the sixth step of the flow chart 65b, after the data is determined to be nonlinear as described above, a further nonlinear analysis is performed on the time series data. Nonlinear analysis techniques include but are not limited to mutual information as described in Equation 1, combined with surrogate data analysis as illustrated in Equation 4 or phase space analysis as is also known in the art.

The surrogate data method where the phase is randomized is expressed in Equation 4:

$$S(n) = \begin{Bmatrix} s(n)\exp[i\phi(n)] \text{ for } n = 1:N/2-1 \\ s(n)\exp[-i\phi(N-n)] \text{ for } n = N/2+1:N-1 \end{Bmatrix} \quad (4)$$

Sequence $\{S(n)\}$ is the overall phase-randomized FFT signal, and sequence $\{\phi(n)\}$, n=1:N/2−1, is randomly shuffled, over $2\pi$ radians, from the original time series. $\{s(n)\}$ is the complex amplitude of the FFT of the original time series. In the surrogate method, the inverse FFT is calculated for the modified $\{S(n)\}$, and this transformed time series is called the surrogate time data used to compare the original signals to the randomized signals. If the randomized signal diverges from the original signal, this signifies that the time series data is nonlinear.

According to the alternate seventh step of the flow chart 70b, the results of the nonlinear analysis of the time series data are compared to the baseline values obtained in second step 45a or 45b to approximate the damage level if any to the structure. The level of damage is an approximation based on the differences between the time series data and the baseline values. The magnitude of the difference is directly related to acceptable tolerances, which are based on the application of the structure itself. A static structure may allow for more of a difference between the data and baseline values than a dynamic structure.

According to the alternate eighth step of the flow chart 75b a decision must be made as to whether to generate an alert because the structure is seriously damaged. If there is a serious level of damage as indicated by a large difference beyond the acceptable baselines, then the graphical user interface will create a visual alert 80b for a user. If there is not a serious level of damage, the next set of time series data of vibration signals is analyzed in the final step 85b.

Figure 3:
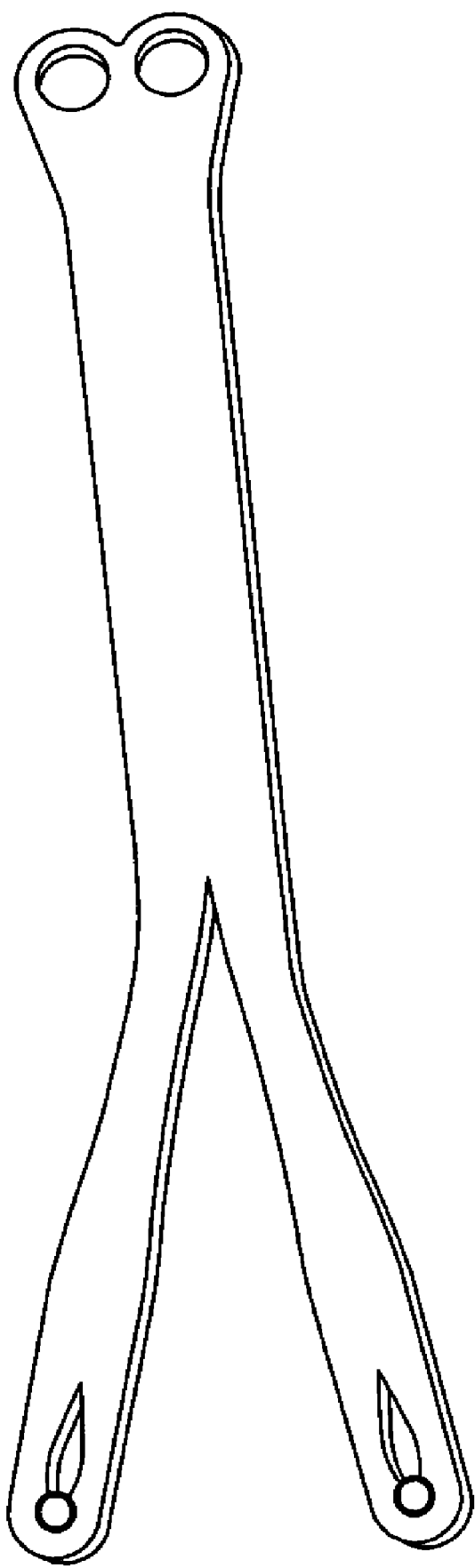
FIG. 3 is an illustration of a helicopter flexibeam used as a test structure.
Figure 4:
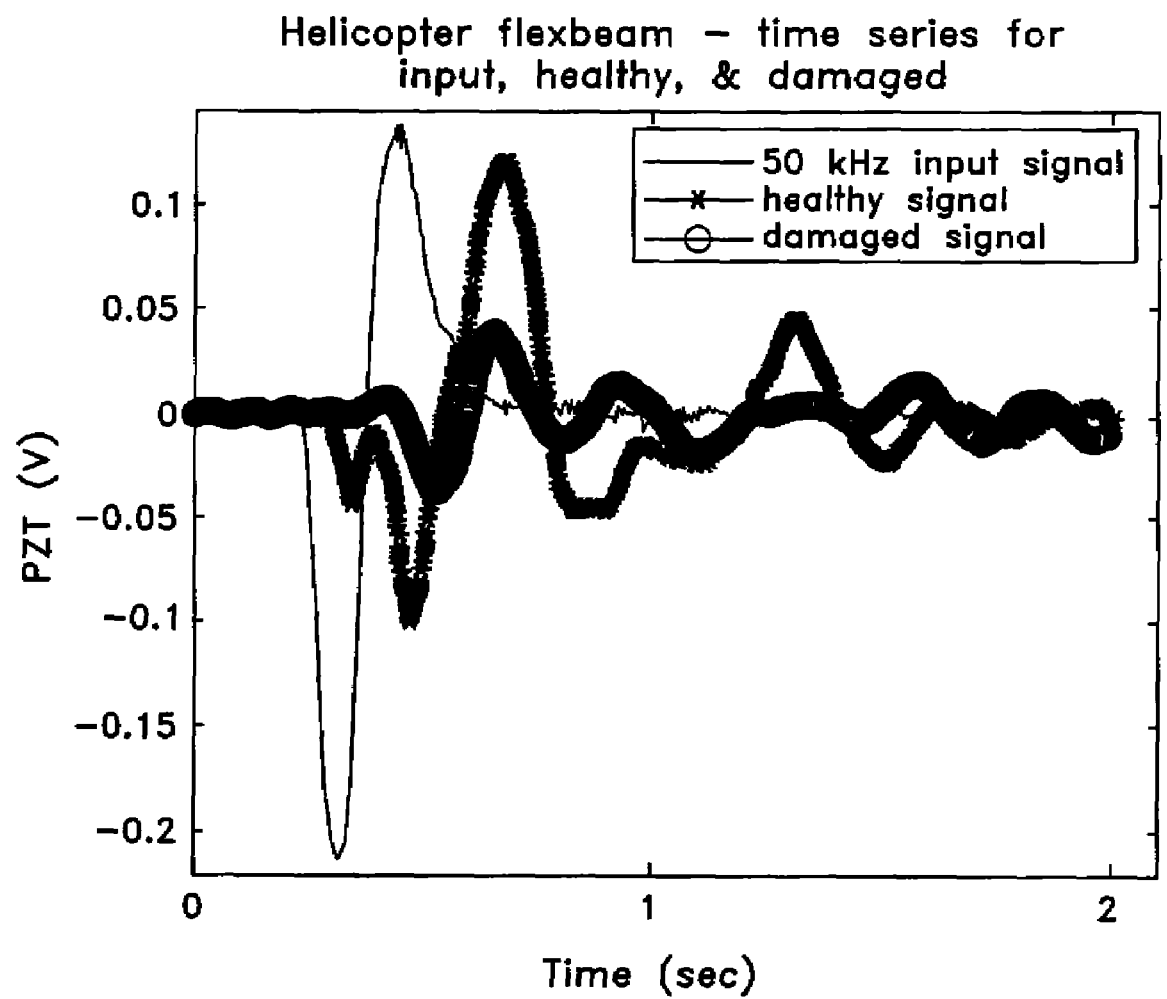
FIG. 4 is a graph of the time series data representing the output of the strain sensors attached to both appendages of the flexibeam.

The signal processing fault detection system 10 of the present invention has been tested on a helicopter flexbeam as illustrated in FIG. 3. The flexbeam is a solid metal support member of a helicopter rotor system. It has a bifurcated end with an upper appendage and a lower appendage. As part of the test the otherwise intact flexbeam was deliberately damaged in the upper appendage to introduce a fault in the structure. Strain sensors were attached to both appendages while the flexbeam was subjected to vibration. The vibrating input signal was 50 kHz. The output signals from the strain sensors attached to both the intact appendage and the damaged appendage are illustrated in the time series graph in FIG. 4. Within the time series graph shown in FIG. 4, there exist time delays and amplitude differences that are qualitatively observable.

Figure 5:
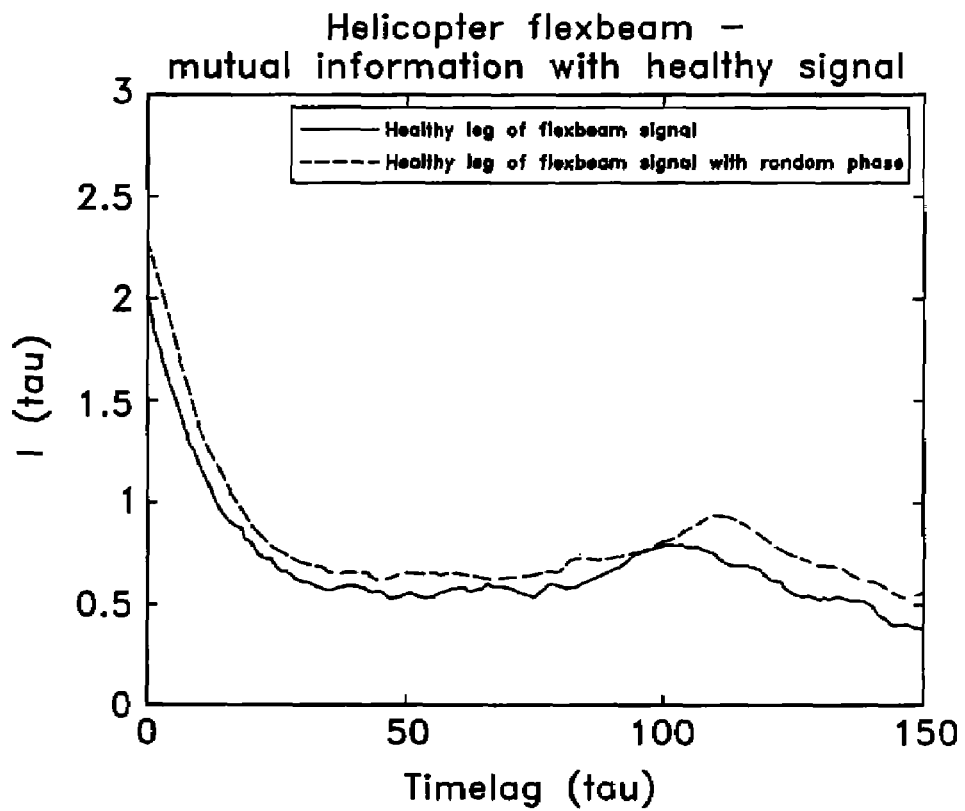
FIG. 5 is a graph of the mutual information analysis of the "healthy" appendage.
Figure 6:
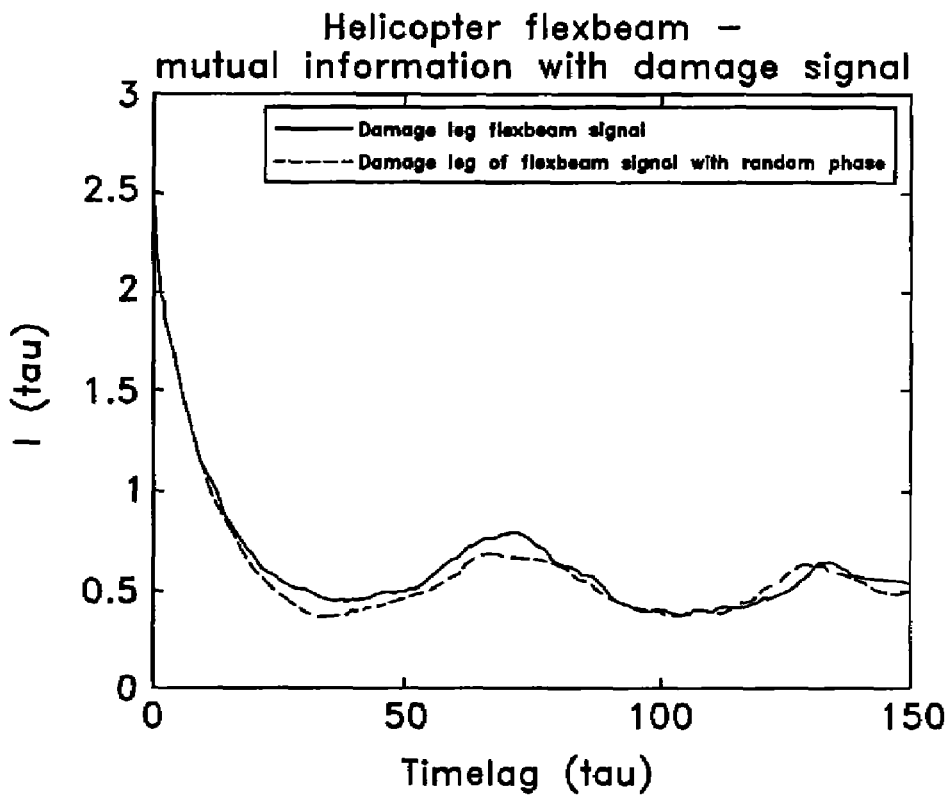
FIG. 6 is a graph of the mutual information analysis of the damaged appendage.

Mutual information analysis is performed on the sensor output signals (i.e., time series data) from the intact appendage to serve as the baseline values for a "healthy" appendage, corresponding to the second step 45b of the method in FIG. 2. The result of the mutual information analysis is illustrated in the graph in FIG. 5. Mutual information analysis is then performed on the sensor output signals from the damaged appendage, the results of which are illustrated in FIG. 6. This corresponds to the fourth step 55 of the method in FIG. 2. Both plots of mutual information indicate linear behavior from the upper appendage and the lower appendage. Linear behavior, as seen in the graph in FIG. 5 is verified by the phase randomized or surrogate data not diverging appreciably from the solid line, which represents the mutual information for the original (i.e. non randomized phase) waveform. For a nonlinear sensor signal, the surrogate data would diverge from the mutual information plot for the reason that nonlinear attributes of a time series are contained in the phase portion of the signal.

According to the fifth step 50 of the flow chart of the method in FIG. 2, the data is determined to have linear characteristics. At step six of the method 65a, the wavelet transmittance function (WTF), Equation 5, is selected to perform a linear analysis on the data obtained from both sensors on both appendages.

$$WTF_{1,2}(\omega, t) = \frac{\overline{W_\psi^1(\omega, t)}}{\overline{W_\psi^2(\omega, t)}} \quad (5)$$

Figure 7:
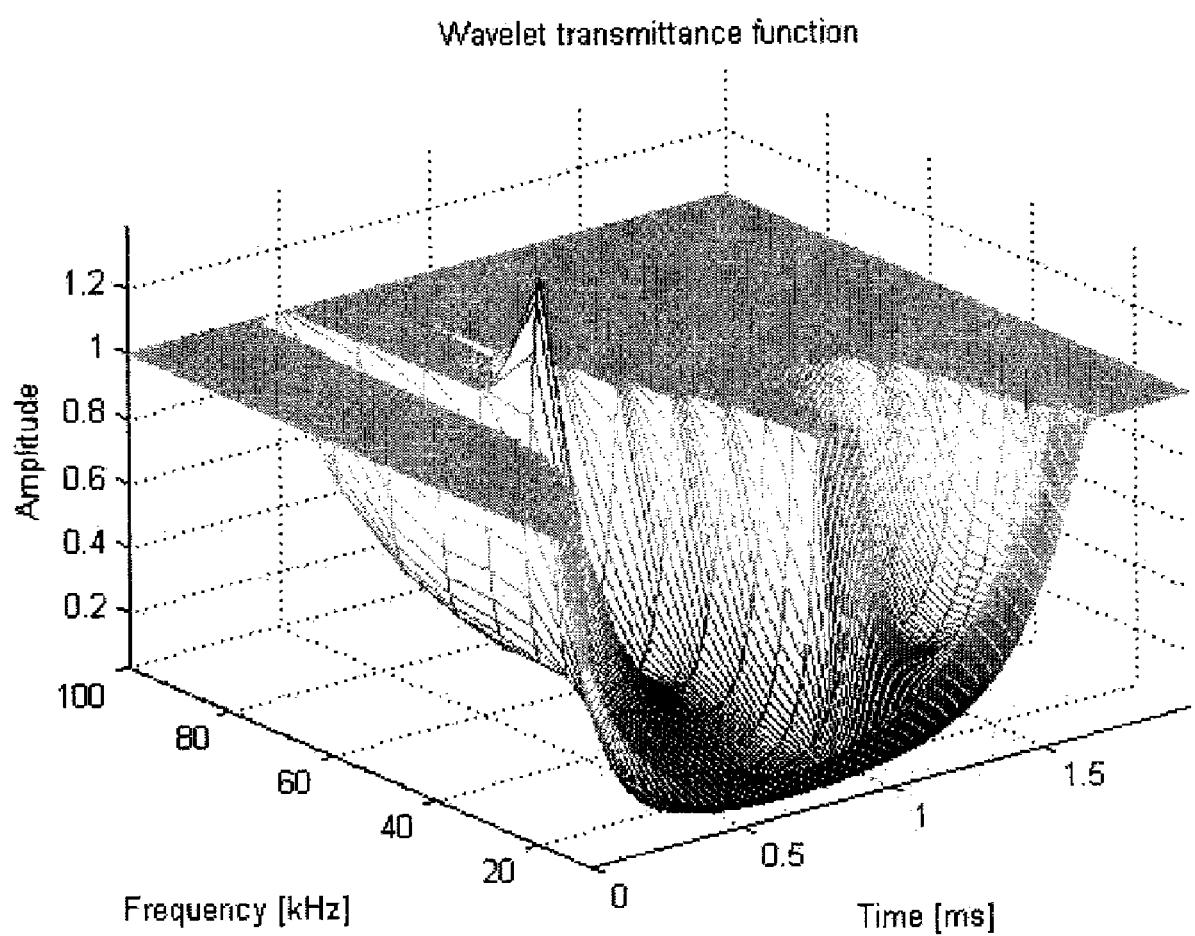
FIG. 7 is a three dimensional graph of the wavelet transmittance function of both appendages.

$WTF_{1,2}(\omega,t)$ is the ratio of sensor 1 average Wavelet transform to sensor 2 average Wavelet transform. The Wavelet transform is a 2-D function of frequency $\omega$ and time t. $\overline{W_\psi(\omega,t)}$ is the average wavelet transform value for each sensor 1, and 2 respectively, which transformed into the frequency and time domains using a complex wavelet as described in Equation 2. A graphical representation of the wavelet transmittance function of the healthy and damaged appendages is illustrated in FIG. 7. The wavelet transmittance function provides a method to quantify the amount of damage within the flexbeam. This corresponds to the seventh step 70a in the method 30 of FIG. 2. For example, an amplitude level of 1.2 may indicate an excessive amount of energy in any appendage of the flexbeam if the baseline level is set at an amplitude level of 0.2.

Figure 8:
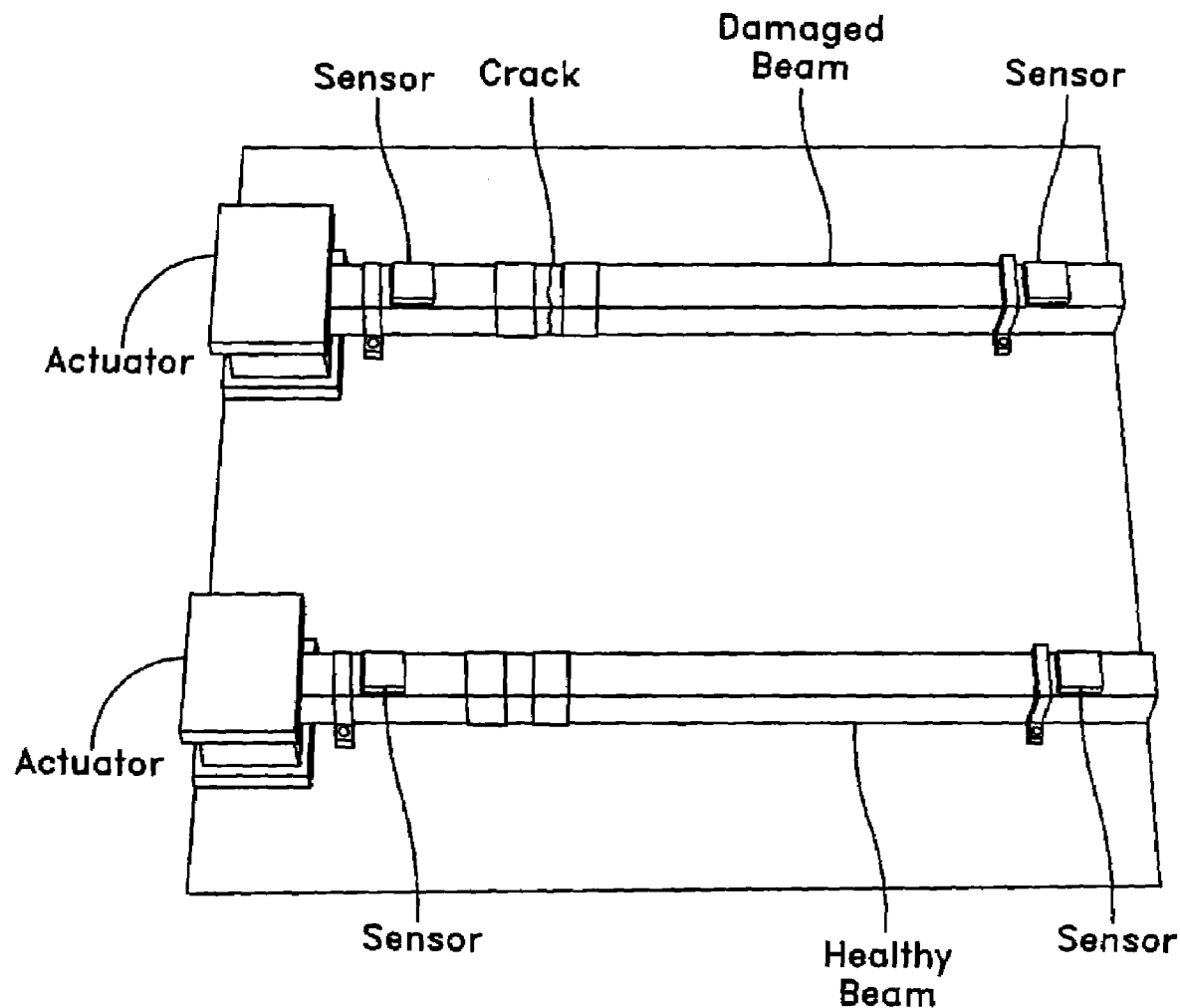
FIG. 8 is an illustration of a damaged and a "healthy" cantilever beam both having sensors attached to each.

In another test of the fault detection system 10, piezoelectric sensors were placed on two aluminum cantilever beams as illustrated in FIG. 8. The beam dimensions are 1"×1¼"× 30". A crack was deliberately created in one of the cantilever beams. Both the damaged and the undamaged cantilever beams were clamped to a test fixture. The sensors were arranged on each beam so that as the wave front propagates across the beam the crack in the damaged beam is between the sensors as illustrated in FIG. 8. One sensor measures the strain created from the actuator at the fixed end. The second sensor measures the strain beyond the crack on the damaged cantilever. The undamaged beam has the sensors in the same locations so as to have the same modal effects. Sensor time series data was obtained for both cantilever beams.

Figure 9:
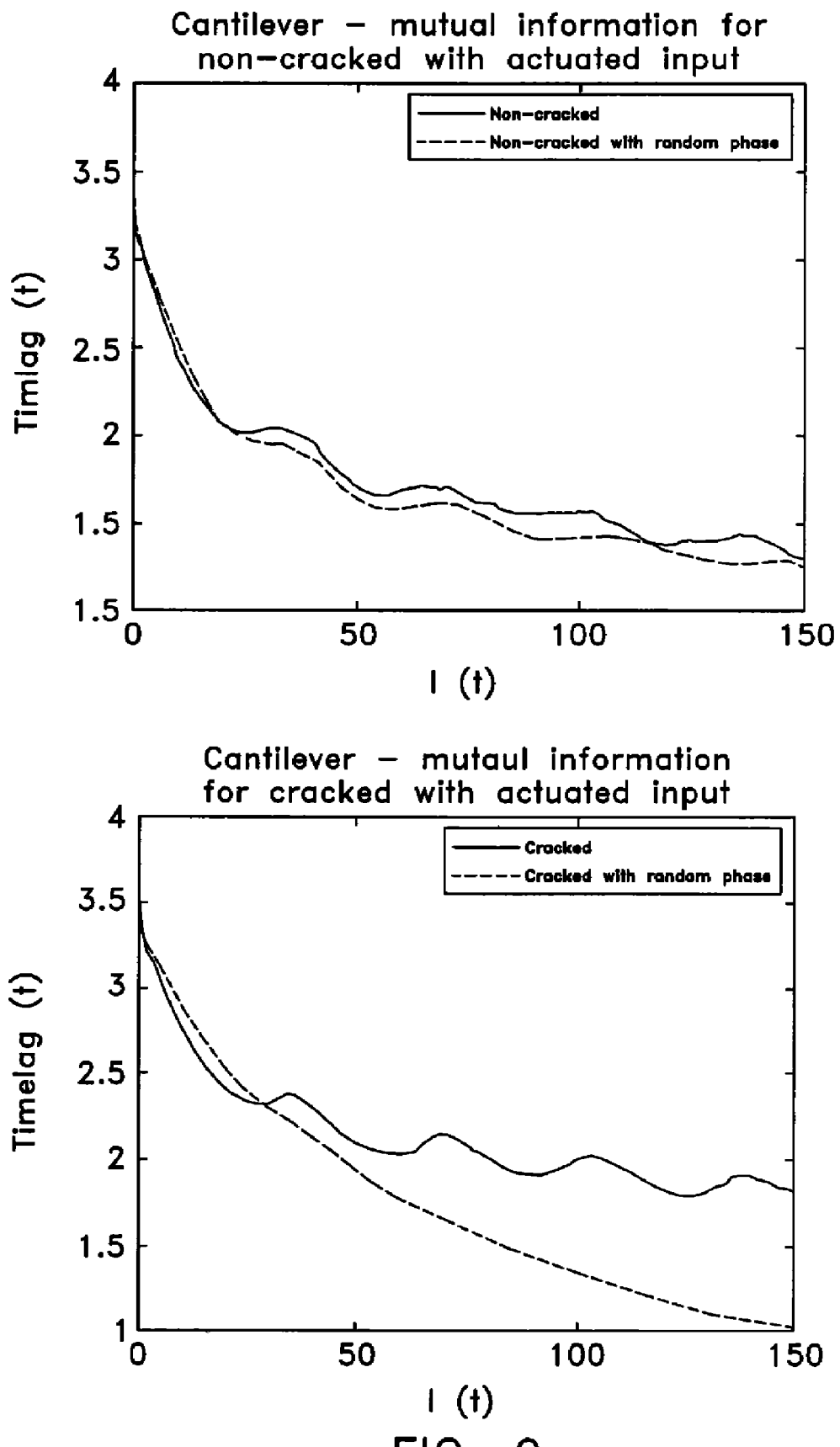
FIG. 9 is a graph of the mutual information analysis of the sensor data obtained from both cantilever beams.

Mutual information analysis was performed with and without random phase on the time series data obtained from the sensors attached to the healthy beam to obtain baseline values corresponding to the second step 45 in the method 30. Mutual information analysis was then performed with and without random phase on the time series data obtained from the sensors attached to the damaged beam. The results of the mutual information analysis performed on the time series data corresponding to both cantilever beams are illustrated in the graphs in FIG. 9, which highlight a separation or divergence in the plot for the damaged beam. Divergence is only seen in the time series data obtained from the cracked beam because the crack creates a nonlinear effect in the data and thus is present in the phase randomized signal.

The divergence indicates that the time series data is nonlinear, which corresponds to the fifth step 60 of the method 30. Therefore, a nonlinear analysis is performed on the time series data according to the sixth step 65b of the method 30 using mutual information analysis combined with surrogate data analysis. The results of this combined analysis are illustrated in the graph in FIG. 9. A determination of damage level according to step 70b of the method 30 is accomplished by measuring the divergence in the two mutual information plots.

The advantage of this invention is the ability to detect nonlinear behavior in complex structures. The invention is a timesaving analysis tool for test engineers, which could be incorporated in a function generator. Moreover, this tool is an aid to determining the optimal signal processing technique required to analyze sensor data.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiments). Therefore, it will be understood that the appended claims are intended to cover all such modifications and embodiments, which would come within the spirit and scope of the present invention.

What is claimed is:

1. A method for detecting material faults in a structure comprising:
   modeling said structure on a computer as a structure with no material faults;
   obtaining time series data from the computer modeled structure wherein said time series data represents vibrations in the computer modeled structure;
   performing a nonlinear analysis on the time series data obtained from the computer modeled structure to use as a baseline of values for said structure with no significant faults;
   deploying a plurality of sensors capable of detecting vibrations on the structure in order to detect vibrations in the structure, wherein each of said plurality of sensors generates a sensor output signal in the form of time series data;
   obtaining experimental time series data from said plurality of sensors;
   performing a preliminary nonlinear analysis on the experimental time series data from said plurality of sensors;
   determining whether said experimental time series data from said plurality of sensors is nonlinear based on said preliminary nonlinear analysis;
   determining whether said experimental time series data from said plurality of sensors is linear based on said preliminary nonlinear analysis;
   performing a linear analysis on said experimental time series data from said plurality of sensors based on the determination that the data was linear;
   performing a further nonlinear analysis on said experimental time series data from said plurality of sensors based on the determination that the data was nonlinear; and
   determining a damage level of the structure based on the variance between the experimental time series data and said baseline of values for said structure with no significant faults, wherein said damage level is related to a specific tolerance for said structure.

2. The method of claim 1 further comprising the step of indicating visually the damage level of the structure on a graphical user interface.

3. The method of claim 1 wherein the step of performing a non linear analysis on the time series data obtained from the computer modeled structure to use as a base line comprises performing a mutual information analysis according to the following equation:

$$I_{A,B} = \sum_{a_i b_j} P_{AB}(a_i b_j) \log_2 \left[ \frac{P_{AB}(a_i b_j)}{P_A(a_i) P_B(b_j)} \right].$$

wherein $P_{AB}(a_i b_j)$ is a joint probability of a set $A=\{a_i\}$ and a set $B=\{b_j\}$, while $P_A(a_i)$ and $P_B(b_j)$ are marginal individual probabilities of each set of A and B.

4. The method of claim 1 wherein said sensors capable of detecting vibrations on the structure are piezoelectric strain sensors.

5. The method of claim 1 wherein the step of performing a preliminary non linear analysis on the time series data obtained from the plurality of sensors comprises performing a mutual information analysis according to the following equation:

$$I_{A,B} = \sum_{a_i b_j} P_{AB}(a_i b_j) \log_2 \left[ \frac{P_{AB}(a_i b_j)}{P_A(a_i) P_B(b_j)} \right].$$

wherein $P_{AB}(a_i b_j)$ is a joint probability of a set $A=\{a_i\}$ and a set $B=\{b_j\}$, while $P_A(a_i)$ and $P_B(b_j)$ are marginal individual probabilities of each set of A and B.

6. The method of claim 1 wherein the step of performing a linear analysis on said experimental time series data from said plurality of sensors comprises performing a wavelet transform function analysis according to the following equation:

$$\psi(a, u) = \int_{-\infty}^{\infty} f(t) \frac{1}{\sqrt{a}} \psi_{a,u}^* \left( \frac{t-u}{a} \right) dt.$$

where $f(t)$ is a measured function and $\psi^*_{a,u}$ is identified as a complex conjugate of a mother wavelet and the variable t represents time, a is defined as a scaling parameter, and u is termed a translation within the time domain.

7. The method of claim 1 wherein the step of performing a linear analysis on said experimental time series data from said plurality of sensors comprises performing a fast Fourier transform analysis according to the following equation:

$$X(\omega_k) = \sum_{n=0}^{N-1} x(t_n)e^{-j\omega_k t_n},$$

$$k = 0, 1, 2, \ldots, N-1$$

wherein $x(t_n)$ is an input signal from the sensors at time $t_n$, usually in (sec), $t_n$ is an nth sampling instant in (sec), $X(\omega_k)$ is a spectrum of x at frequency $\omega_k$, $\omega_k$ is a kth frequency sample in (rad/sec), and N is a number of samples and number of frequency samples.

8. The method of claim 1 wherein the step of performing a further nonlinear analysis on said experimental time series data from said plurality of sensors comprises performing a mutual information analysis combined with a surrogate data method analysis according to the following $$I_{A,B} = \sum_{a_i b_j} P_{AB}(a_i b_j) \log_2 \left[ \frac{P_{AB}(a_i b_j)}{P_A(a_i) P_B(b_j)} \right],$$

and $$S(n) = \left\{ \begin{array}{l} s(n)\exp[i\phi(n)] \text{ for } n = 1:N/2-1 \\ s(n)\exp[-i\phi(N-n)] \text{ for } n = N/2+1:N-1 \end{array} \right\}.$$

wherein $P_{AB}(a_i b_j)$ is a joint probability of a set $A=\{a_i\}$ and a set $B=\{b_j\}$, while $P_A(a_i)$ and $P_B(b_j)$ are marginal individual probabilities of each set of A and B, sequence $\{S(n)\}$ is an overall phase-randomized FFT signal, and sequence $\{\phi(n)\}$, n=1:N/2−1, is randomly shuffled, over $2\pi$ radians, from an original time series, and $\{s(n)\}$ is a complex amplitude of the FFT of the original time series.

9. A method for detecting material faults in a structure comprising:
deploying a first plurality of sensors capable of detecting vibrations on a first structure with no material faults in order to detect vibrations in said first structure, wherein each of said first plurality of sensors generates a sensor output signal in the form of time series data;
obtaining time series data from the first plurality of sensors structure wherein said time series data represents vibrations in the first structure;
performing a nonlinear analysis on the time series data obtained from the first plurality of sensors to use as a baseline of values for said first structure with no significant faults;
deploying a second plurality of sensors capable of detecting vibrations on a second structure in order to detect vibrations in said second structure, wherein each of said plurality of sensors generates a sensor output signal in the form of time series data;
obtaining experimental time series data from said second plurality of sensors;
performing a preliminary nonlinear analysis on the experimental time series data from said second plurality of sensors;
determining whether said experimental time series data from said second plurality of sensors is nonlinear based on said preliminary nonlinear analysis;
determining whether said experimental time series data from said second plurality of sensors is linear based on said preliminary nonlinear analysis;
performing a linear analysis on said experimental time series data from said second plurality of sensors based on the determination that the data was linear;
performing a further nonlinear analysis on said experimental time series data from said second plurality of sensors based on the determination that the data was nonlinear; and
determining a damage level of the second structure based on the variance between the experimental time series data and said baseline of values for said first structure with no significant faults, wherein said damage level is related to a specific tolerance for said first structure.

10. The method of claim 9 further comprising the step of indicating visually the damage level of said second structure on a graphical user interface.

11. The method of claim 9 wherein the step of performing a non linear analysis on the time series data obtained from the first plurality of sensors to use as a base line comprises performing a mutual information analysis according to the following equation:

$$I_{A,B} = \sum_{a_i b_j} P_{AB}(a_i b_j) \log_2 \left[ \frac{P_{AB}(a_i b_j)}{P_A(a_i) P_B(b_j)} \right].$$

wherein $P_{AB}(a_i b_j)$ is a joint probability of a set $A=\{a_i\}$ and a set $B=\{b_j\}$, while $P_A(a_i)$ and $P_B(b_j)$ are marginal individual probabilities of each set of A and B.

12. The method of claim 9 wherein said sensors capable of detecting vibrations on a structure are piezoelectric strain sensors.

13. The method of claim 9 wherein the step of performing a preliminary non linear analysis on the time series data obtained from the second plurality of sensors comprises performing a mutual information analysis according to the following equation:

$$I_{A,B} = \sum_{a_i b_j} P_{AB}(a_i b_j) \log_2 \left[ \frac{P_{AB}(a_i b_j)}{P_A(a_i) P_B(b_j)} \right].$$

wherein $P_{AB}(a_i b_j)$ is a joint probability of a set $A=\{a_i\}$ and a set $B=\{b_j\}$, while $P_A(a_i)$ and $P_B(b_j)$ are marginal individual probabilities of each set of A and B.

14. The method of claim 9 wherein the step of performing a linear analysis on said experimental time series data from said second plurality of sensors comprises performing a wavelet transform function analysis according to the following equation:

$$\psi(a, u) = \int_{-\infty}^{\infty} f(t) \frac{1}{\sqrt{a}} \psi_{a,u}^*\left(\frac{t-u}{a}\right) dt.$$

where $f(t)$ is a measured function and $\psi^*_{a,u}$ is identified as a complex conjugate of a mother wavelet and the variable t represents time, a is defined as a scaling parameter, and u is termed a translation within the time domain.

15. The method of claim 9 wherein the step of performing a linear analysis on said experimental time series data from said second plurality of sensors comprises performing a fast Fourier transform analysis according to the following equation:

$$X(\omega_k) = \sum_{n=0}^{N-1} x(t_n)e^{-j\omega_k t_n},$$

$$k = 0, 1, 2, \ldots, N-1.$$

wherein $x(t_n)$ is an input signal from the sensors at time $t_n$ usually in (sec), $t_n$ is an nth sampling instant in (sec), $X(\psi_k)$ is a spectrum of x at frequency $\omega_k$, $\omega_k$ is a kth frequency sample in (rad/sec), and N is a number of samples and number of frequency samples.

16. The method of claim 1 wherein the step of performing a further nonlinear analysis on said experimental time series data from said second plurality of sensors comprises performing a mutual information analysis combined with a surrogate data method analysis according to the following $$I_{A,B} = \sum_{a_i b_j} P_{AB}(a_i b_j) \log_2 \left[ \frac{P_{AB}(a_i b_j)}{P_A(a_i) P_B(b_j)} \right],$$

and $$S(n) = \begin{cases} s(n)\exp[i\phi(n)] & \text{for } n = 1:N/2-1 \\ s(n)\exp[-i\phi(N-n)] & \text{for } n = N/2+1:N-1 \end{cases}.$$

wherein $P_{AB}(a_i b_j)$ is a joint probability of a set $A=\{a_i\}$ and a set $B=\{b_j\}$, while $P_A(a_i)$ and $P_B(b_j)$ are marginal individual probabilities of each set of A and B, sequence $\{S(n)\}$ is an overall phase-randomized FFT signal, and sequence $\{\phi(n)\}$, n=1:N/2−1, is randomly shuffled, over $2\pi$ radians, from an original time series, and $\{s(n)\}$ is a complex amplitude of the FFT of the original time series.

* * * * *